United States Patent [19]

Hutchisson et al.

[11] Patent Number: 4,825,069
[45] Date of Patent: Apr. 25, 1989

[54] RELATIVE MOVEMENT SENSOR

[75] Inventors: James T. Hutchisson, Bellevue; Marcell N. Benoit, Mountlake Terrace, both of Wash.

[73] Assignee: Lodec, Inc., Lynnwood, Wash.

[21] Appl. No.: 50,543

[22] Filed: May 15, 1987

[51] Int. Cl.$^4$ .............................................. G01D 5/34
[52] U.S. Cl. .................................. 250/229; 250/231 R
[58] Field of Search ............. 250/229, 231 R; 73/800, 73/705, DIG. 11; 177/210 EM, 212, 177, DIG. 6

[56] References Cited

U.S. PATENT DOCUMENTS

| | | | |
|---|---|---|---|
| 3,229,511 | 1/1966 | Rossire | 73/88 .5 |
| 3,421,594 | 1/1969 | Hino | 177/DIG. 6 |
| 3,423,597 | 1/1969 | Delp | 250/231 R |
| 3,805,907 | 4/1974 | Knothe et al. | 177/210 |
| 3,913,563 | 10/1975 | Ball | 73/DIG. 11 |
| 4,070,661 | 1/1978 | Marko | 250/209 |
| 4,275,599 | 6/1981 | Kohlenberger et al. | 73/774 |
| 4,393,713 | 7/1983 | Guillemot | 73/705 |
| 4,451,730 | 5/1984 | Brogardh et al. | 250/227 |
| 4,625,819 | 12/1986 | O'Neill | 177/212 |
| 4,626,680 | 12/1986 | Martens et al. | 73/705 |

OTHER PUBLICATIONS

R. Michael Madden, Ph.D., "Silicon Position Sensing Detectors for Precision Measurement and Control," SPIE vol. 153, Advances in Optical Metrology (1978), pp. 101–107.

Primary Examiner—David C. Nelms
Attorney, Agent, or Firm—Christensen, O'Connor, Johnson & Kindness

[57] ABSTRACT

A relative movement sensor that may be used to measure the force applied to a beam, for example to provide an onboard weighing system for a truck. The sensor measures relative movement between first and second portions of the beam, and includes a housing connected to the first portion and a mounting block connected to the second portion. An optical source and a pair of optical detectors are secured to the housing. A line between the first and second portions define a first axis, and a line between the source and a point midway between the detectors defines a second axis. The mounting means mounts a beam modulator between the source and detectors, such that relative movement as between the first and second portions results in movement of the beam modulator with respect to the housing. A measurement circuit provides an output signal corresponding to the relative illumination falling on the detectors. The beam modulator is shaped such that the output signal varies as the beam modulator moves along a third axis perpendicular to the first and second axes. The beam modulator may comprise a plate having a slit, the width of the slit along the third axis being substantially constant.

10 Claims, 2 Drawing Sheets

RELATIVE MOVEMENT SENSOR

FIELD OF THE INVENTION

The present invention relates to sensors for measuring relative movement between first and second portions of a structure One application of such a sensor is in an onboard weighing system for a truck.

BACKGROUND OF THE INVENTION

A known type of onboard weighing system for trucks comprises a transducer mounted to a beam that flexes as the weight of the load carried by the truck changes. The sensor measures the degree to which the beam bends, and provides a readout indicating the load carried and/or the gross weight of the vehicle.

Transducers used in onboard weighing systems have included linear, variable differential transformers (LVDTs) and strain gauges. However, prior weighing systems that rely on these transducers are plagued by a number of problems, in particular by temperature drift and by nonlinearity of the transducer output with applied force.

In applications other than truck weighing systems, optical techniques have been proposed on a number of occasions for measuring the stress or flexure of a member under an applied force. An example of an optical stress sensor is U.S. Pat. No. 3,229,511. In the system proposed in that patent, the stress in a wing spar is measured by a system that includes a light source mounted at a first position on the wing spar, and two photosensitive elements mounted at a second position along the wing spar. This system is initially adjusted such that an equal amount of light from the source falls on both photosensitive elements. Subsequently, when the spar is flexed, movement of the beam with respect to the photosensors causes a change in the differential output of the photosensors, which change is measured and converted to a force. Although the described optical system has certain advantages over systems using strain gauges and LVDTs, it remains subject to temperature drift and nonlinearity problems.

SUMMARY OF THE INVENTION

The present invention provides a relative movement sensor having increased accuracy and resistance to errors with respect to prior sensors. In particular, the sensor of the present invention has significantly improved immunity to errors caused by differential thermal expansion between the sensor and the structure to which it is attached. One important application of the sensor of the present invention is as a force sensor for measuring the force applied to a beam or similiar structural member. Such a force sensor may be used to provide an onboard weighing system for trucks.

In a preferred embodiment, the sensor of the present invention is adapted for measuring the relative movement of first and second portions of a structure. The line between the first and second portions is taken to define a first axis. The sensor comprises a housing connected to the structure at the first portion, and mounting means connected to the structure at the second portion. An optical source and a pair of optical detectors are secured to the housing, such that the source and detectors do not move relative to one another. The detectors are positioned adjacent to one another, and a line between the source and a point midway between the detectors is taken to define a second axis. The mounting means mounts a beam modulator, such that the beam modulator is interposed between the source and detectors. The mounting means is connected to the structure at the second portion, such that relative translational or rotational movement of the second portion with respect to the first portion results in movement of the beam modulator with respect to the housing. A measurement circuit is connected to the detectors for providing an output signal corresponding to the relative illumination falling on the detectors. The beam modulator is shaped such that the output signal varies as the beam modulator undergoes movement along a third axis perpendicular to the first and second axes.

In a preferred arrangement, the beam modulator comprises a plate having a slit formed therein. The plate is disposed perpendicular to the second axis. The slit has a comparatively small width dimension parallel to the third axis, and a comparatively long length dimension parallel to the first axis, and the width of the slit is substantially constant along its length.

DETAILED DESCRIPTION OF THE DRAWINGS

Figure 1:
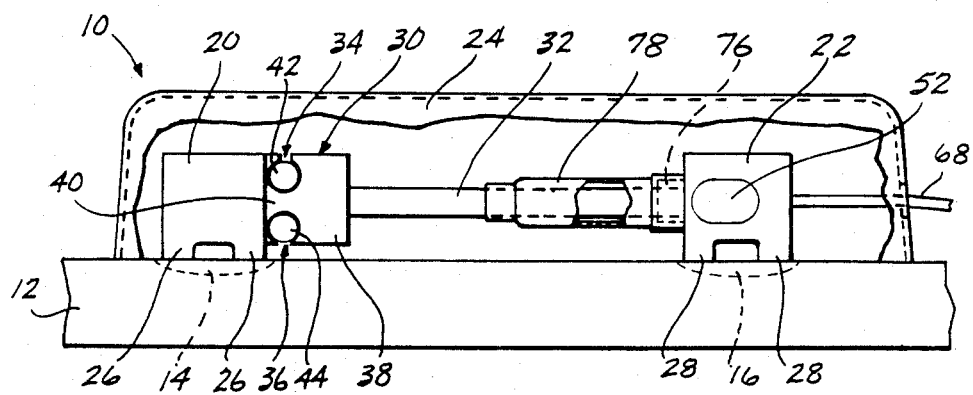
FIG. 1 is a partially cut away side-elevational view of the relative movement sensor of the present invention employed as a force sensor.

FIG. 1 shows a preferred embodiment of the relative movement sensor 10 of the present invention in use as a force sensor. Relative movement sensor 10 is mounted to beam 12 at first portion 14 and second portion 16, and operates to measure the relative movement of portions 14 and 16 with respect to one another, such as in response to bending of beam 12 by an applied force. By suitable calibration procedures, the relative movement of portions 14 and 16 can be converted into a measure of the force acting to bend the beam. An example of the application of the force sensor shown in FIG. 1 is as a load cell connected between the frame and load carrying portion of a truck, for measuring the weight carried by the load carrying portion. Techniques for utilizing force sensors as truck load cells are well known to those skilled in the art, and do not form a part of the present invention.

Relative movement sensor 10 comprises mounting block 20 secured to first portion 14, and housing 22 secured to second portion 16. Cover 24 overlies the sensor as a whole, the principal function of cover 24 being protection of the sensor from dirt and other contaminants. Mounting block 20 is secured to first portion 14 via a plurality of legs 26, and housing 22 is similarly secured to second portion 16 via a plurality of legs 28. The connections between the legs and beam 12 are preferably made by welding, as further described below. The cover may be secured to beam 12 by any suitable means.

Adjustment assembly 30 is secured to and extends laterally from mounting block 20 in a direction towards housing 22, and arm 32 is connected to and extends from the adjustment assembly, also towards housing 22. Adjustment assembly 30 comprises a generally rectangular block having a pair of parallel, internally threaded openings 34 and 36. Openings 34 and 36 form a mounting shoulder 38 that is connected to mounting block 20 via flexure 40 between the openings, the flexure being sufficiently flexible to permit mounting shoulder 38 and arm 32 to rotate up or down (as viewed in FIG. 1) with respect to the mounting block. Tapered pipe screws 42 and 44 are threaded into openings 34 and 36 respectively. By threading pipe screws 42 and 44 to appropriate insertion depths, the orientation of arm 32 can be adjusted upward and downward, about a center of rotation that is positioned approximately between openings 34 and 36. The purpose of this adjustment will be described below.

Figure 2:
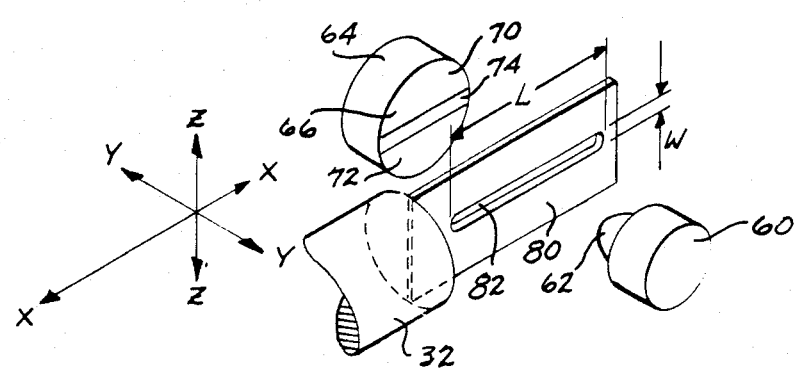
FIG. 2 is a perspective view of the optical elements of the sensor.
Figure 3:
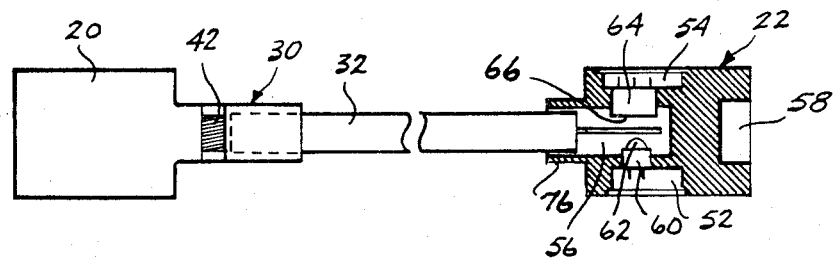
FIG. 3 is a top-elevational view, partly in cross section, of the sensor.

Referring now to FIGS. 1-3, housing 22 includes side openings 52 and 54, front opening 56 and rear opening 58. LED 60 is mounted in housing 22 between side opening 52 and front opening 56, such that the light emitting portion 62 of the LED extends into front opening 56. In a similar manner, differential photodetector 64 is mounted in housing 22 between side opening 54 and front opening 56, such that the sensitive face 66 of the differential photodetector faces into front opening 56, and is positioned directly across from light emitting portion 62 of LED 60. Sensitive face 66 includes upper detector 70 and lower detector 72 separated by a narrow gap 74. Detectors 70 and 72 are described in more detail below. Electrical connections to the LED and detectors are provided by cable 68 via rear opening 58. A suitable component for LED 60 is the HLMP-0563 device available from Hewlett-Packard. A suitable component for differential photodetector 64 is the VT-333/2 dual element photoconductive cell available from Vactec. An LED is preferred over an incandescent source for the optical source, due to the fact that filament motion in an incandescent source could introduce errors in the sensor output.

As shown in FIGS. 1 and 3, cylindrical lip 76 extends laterally from housing 22 in the direction of mounting block 20, the cylindrical lip thereby forming an extension of front opening 56. Arm 32 extends into front opening 56 via cylindrical lip 76, and the front opening is then sealed against dust or other contaminants by flexible member 78 that extends over arm 32 and cylindrical lip 76, as shown in FIG. 1. A beam modulator in the form of plate 80 is mounted on the end of arm 32, such that the plate is positioned between LED 60 and differential photodetector 64. Plate 80 includes a longitudinal slit 82 having a width W and a length L. Referring to FIG. 2 and to the coordinate system depicted therein, plate 80 lies in the X-Z plane, with the length dimension being parallel to the X axis, and the width dimension being parallel to the Z axis. The X axis is parallel to arm 32 and to a line extending between first portion 14 and second portion 16 of beam 12. The Y axis is parallel to a line extending between the center of light emitting portion 62 of LED 60, and the center of differential photodetector 64. Thus a line parallel to the Y axis extending from the center of light emitting portion 62 intersects differential photodetector 64 at a point symmetrically positioned between detectors 70 and 72 in gap 74.

Figure 4:
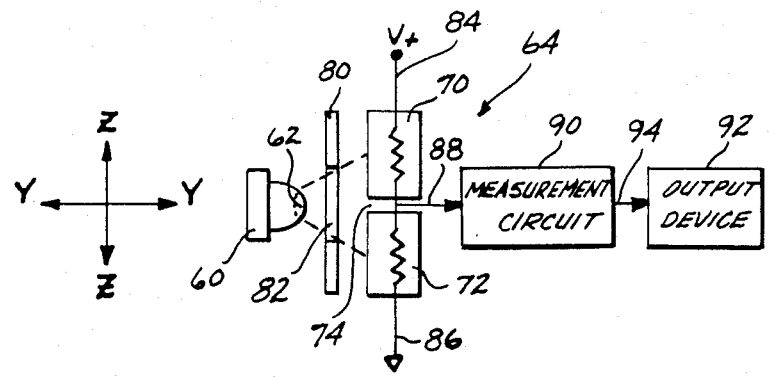
FIG. 4 is a schematic diagram of the optical elements of the sensor.

The operation of LED 60, differential photodetector 64 and plate 80 is diagrammed in FIG. 4. Detectors 70 and 72 are connected in series between a positive voltage supply V+ and ground via lines 84 and 86 respectively, and the junction between the serially connected detectors is connected to measurement circuit 90 via line 88. Measurement circuit 90 in turn produces an appropriate output signal on line 94 to output device 92. When the sensor is initially calibrated, the position of arm 32 is adjusted via screws 42 and 44 (FIG. 1) such that slit 82 is centered (along the Z axis) between LED 60 and differential photodetector 64. In this position, an equal amount of light from LED 60 falls on detectors 70 and 72, and the signal on line 86 is a voltage positioned halfway between the positive supply voltage and ground. In this position, measurement circuit 90 is calibrated to provide a null signal (i.e., an output signal representing zero force) on line 94 to output device 92. Subsequently, when a force is applied to beam 12, first portion 14 and second portion 16 undergo rotation and/or translation with respect to one another, with the result that plate 80 and gap 82 move along the Z axis. The amount of light received by detector 70 then differs from the amount of light received by detector 72, and the signal on line 86 varies upward or downward from its center position, depending on the direction of movement along the Z axis. This variation on the voltage on line 88 is sensed by measurement circuit 90, and an appropriate output signal is produced to output device 92.

For a force sensor adapted for use on the walking beam of a truck, suitable dimensions for slit 82 are a length of 0.5 inches, and a width of 0.5 millimeters. In general, as the width W is made larger, the sensitivity of the instrument decreases, whereas as the width W is made smaller, less light is received by the differential photodetector, and the impedance and temperature drift of the detectors 70 and 72 therefore increase. In general, it is preferred to make width W of slit 82 about equal to gap 74 between detector 70 and 72. The spacing between the LED and the differential photodetector may also be varied to suit the particular application. In general, a smaller distance will produce a higher sensitivity of the sensor. Plate 80 should also be positioned as close as practicable to detectors 70 and 72, to increase sensitivity. High sensitivity also requires the exclusion of stray light from front opening 56. Such exclusion may be achieved by painting the interior of front opening black and by the use of flexible member 78 (FIG. 1).

The described relative movement sensor possesses a number of significant advantages as compared to prior "distributed" sensors that have active elements (e.g., optical sources and/or detectors) at both ends of the device, i.e., at or adjacent to first portion 14 and second portion 16. In a distributed system, thermal effects, such as expansion or contraction of the beam, can readily lead to erroneous output signals. In the present invention, LED 60 and differential photodetector 64 are positioned at one end of the sensor, and are connected together in a rigid housing, to minimize such sources of error. Furthermore, the principal effect produced by an expansion or contraction of beam 12 will be the movement of plate 80 along the X axis, a movement that will not effect the output of the sensor, so long as the length L of slit 82 is large enough to provide full illumination on the differential photodetector despite lengthwise movement of the plate. The sensor of the present invention is similarly insensitive to a small displacement of plate 80 along the Y axis. A further advantage of the present invention is the intrinsic linearity that flows from the use of matched differential detectors, such as detectors 70 and 72 of differential photodetector 64. In systems constructed according to the present invention, sensitivities of 200 millivolts per 0.001 inches have been regularly achieved.

Figure 5:
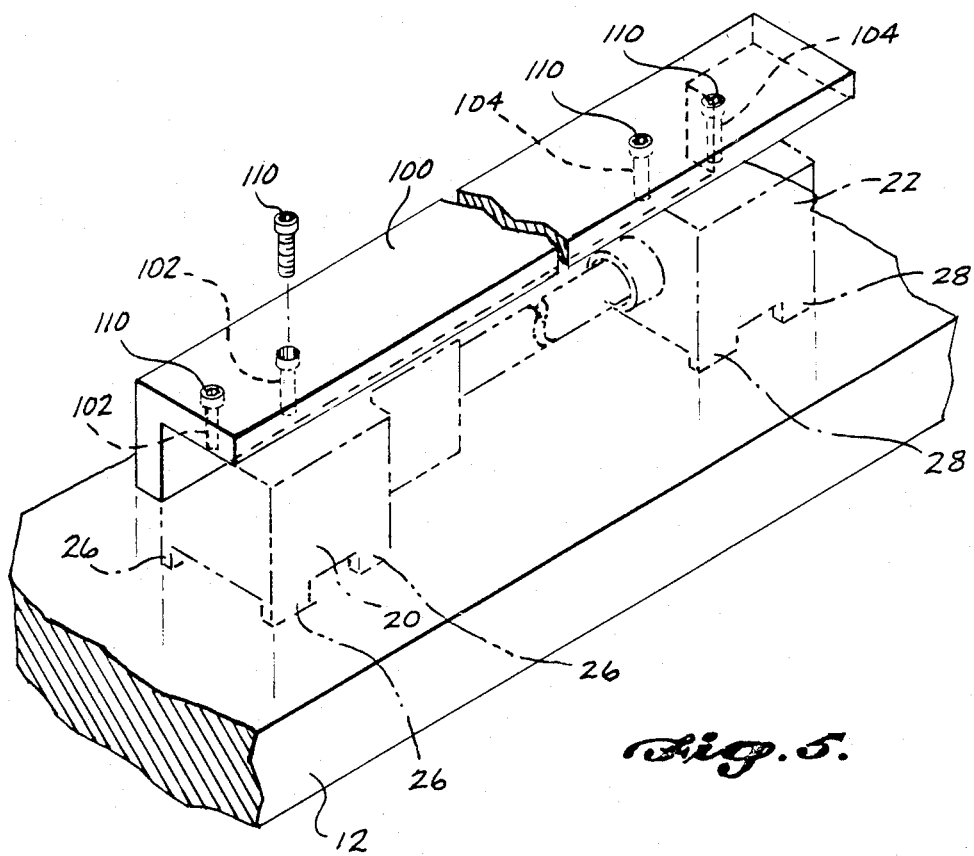
FIG. 5 is a perspective view illustrating the mounting of the sensor to a beam.

A method for mounting sensor 10 on beam 12 is illustrated in FIG. 5. The mounting utilizes a mounting fixture 100 having the general form of an angle bracket. The mounting fixture includes holes 102 that are aligned with a similar pair of holes on the upper surface of mounting block 20, and holes 104 that are aligned with a similar set of holes on the upper surface of housing 22. Screws 110 are passed through holes 102 and 104, into the mounting block and housing respectively, to rigidly connect these structures together. Legs 26 and 28 are then welded to beam 12, after which screws 110 are withdrawn and mounting fixture 100 removed. In general, mounting block 20 and housing 22 should be constructed from a material having a coefficient of thermal expansion as similar as possible to that of beam 12. For a truck onboard weighing system to be applied to a truck suspension beam, 1018 steel is a suitable material for the mounting block and housing. The advantage of welding the mounting block and housing to the beam, rather than using another attachment technique, is that welding provides a rigid mount, and does not introduce an additional material that may ave a different coefficient of thermal expansion.

While the preferred embodiments of the invention have been illustrated and described, it will be apparent that variations will occur to those skilled in the art. For example, the beam modulator represented in the figures by plate 80 and slit 82 could be replaced by a vane or any other structure that would cause a predictable variation of the output of differential photodetector 64 in response to a movement of arm 32 along the Z axis. The invention is therefore not to be limited to the specific embodiments illustrated and described, and the true scope of the invention is to be determined by reference to the following claims.

The embodiments of the invention in which an exclusive property or privilege is claimed are defined as follows:

1. A sensor for measuring relative movement of a first portion of a structure with respect to a second portion of the structure, a line between the first and second portions defining a first axis, the sensor comprising:
    a housing connected to the structure at the first portion;
    an optical source and a pair of optical detectors, the source and detectors being secured to the housing such that the source and detectors do not move relative to one another, the detectors being positioned adjacent to one another, a line between the source and a point midway between the detectors defining a second axis;
    a beam modulator;
    mounting means for mounting the beam modulator such that the beam modulator is interposed between the source and detectors, the mounting means being connected to the structure at the second portion such that relative movement of the second portion with respect to the first portion results in movement of the beam modulator with respect to the housing;
    circuit means connected to the detectors for providing an output signal corresponding to the relative illumination falling on the detectors;
    the beam modulator being shaped such that the output signal varies as the beam modulator undergoes movement along a third axis perpendicular to the first and second axes; and
    an output device for displaying the output signal, to thereby indicate the degree of relative movement between the first and second portions of the structure.

2. The sensor of claim 1, wherein the beam modulator comprises a plate having a slit formed therein, the plate being disposed perpendicular to the second axis, the slit having a comparatively small width dimension parallel to the third axis and a comparatively long length dimension parallel to the first axis, the width of the slit being substantially constant.

3. The sensor of claim 1, wherein the pair of optical detectors comprises a dual element photodetector having first and second detectors separated by a gap.

4. The sensor of claim 3, wherein the width of the gap is approximately equal to the width of the slit.

5. The sensor of claim 1, wherein the mounting means comprises a mounting block mounted to the structure at the second portion and an arm having a first end connected to the mounting block and a second end connected to the beam modulator, the arm being parallel to the first axis.

6. The sensor of claim 5, wherein the mounting block includes adjustment means for moving the arm such that the beam modulator moves along the third axis.

7. The sensor of claim 6, wherein neither the arm nor the beam modulator makes physical contact with the housing, source or detectors.

8. The sensor of claim 7, further comprising a flexible cover connected between the arm and housing to exclude light and extraneous material therefrom.

9. The sensor of claim 1, wherein the second axis is normal to the first axis.

10. The sensor of claim 1, wherein the beam modulator comprises a vane.

* * * * *